(12) United States Patent
Chang (10) Patent No.: US 8,367,238 B2
(45) Date of Patent: Feb. 5, 2013

(54) MOUNTING APPARATUS FOR BATTERY MODULE

(75) Inventor: Chin-Ming Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 841 days.

(21) Appl. No.: 12/509,503

(22) Filed: Jul. 27, 2009

(65) Prior Publication Data

US 2010/0247995 A1      Sep. 30, 2010

(30) Foreign Application Priority Data

Mar. 25, 2009    (CN) .......................... 2009 1 0301111

(51) Int. Cl.
*H01M 2/10*        (2006.01)

(52) U.S. Cl. ................. 429/100; 312/223.1; 312/223.2; 429/96

(58) Field of Classification Search ............... 312/223.2
See application file for complete search history.

(56) References Cited

U.S. PATENT DOCUMENTS 5,124,887 A * 6/1992 Kobayashi ............... 361/679.39
5,634,815 A * 6/1997 Inazuka et al. ............... 429/100
7,333,324 B2 * 2/2008 DeLuga ................... 361/679.55

* cited by examiner

*Primary Examiner* — Yogendra Gupta
*Assistant Examiner* — Alison Hindenlang
(74) *Attorney, Agent, or Firm* — Altis Law Group, Inc.

(57) ABSTRACT

A mounting apparatus for a battery module includes a base, a latching member slidably attached to the base to fix the battery module, and an operating member rotatably attached to the base. When the operating member of the mounting apparatus is rotated, the latching member is driven to slide to disengage from the battery module.

20 Claims, 7 Drawing Sheets

MOUNTING APPARATUS FOR BATTERY MODULE

BACKGROUND

1. Technical Field

The present disclosure relates to mounting apparatuses, and particularly, to a mounting apparatus for a battery module.

2. Description of Related Art

An ordinary electronic device, such as a portable computer, usually has a detachable battery module. Typically, the battery module is fixed to a mounting apparatus which includes an operable slide knob, and a latching mechanism for hooking the battery module. When the slide knob is slid along a predetermined path, the latching mechanism is moved to disengage from the battery module. However, the force needed to slide the knob depends on friction between the slide knob and fingers of an operator. It can uncomfortable and difficult for an operator to provide enough force to slide the knob.

DETAILED DESCRIPTION

Figure 1:
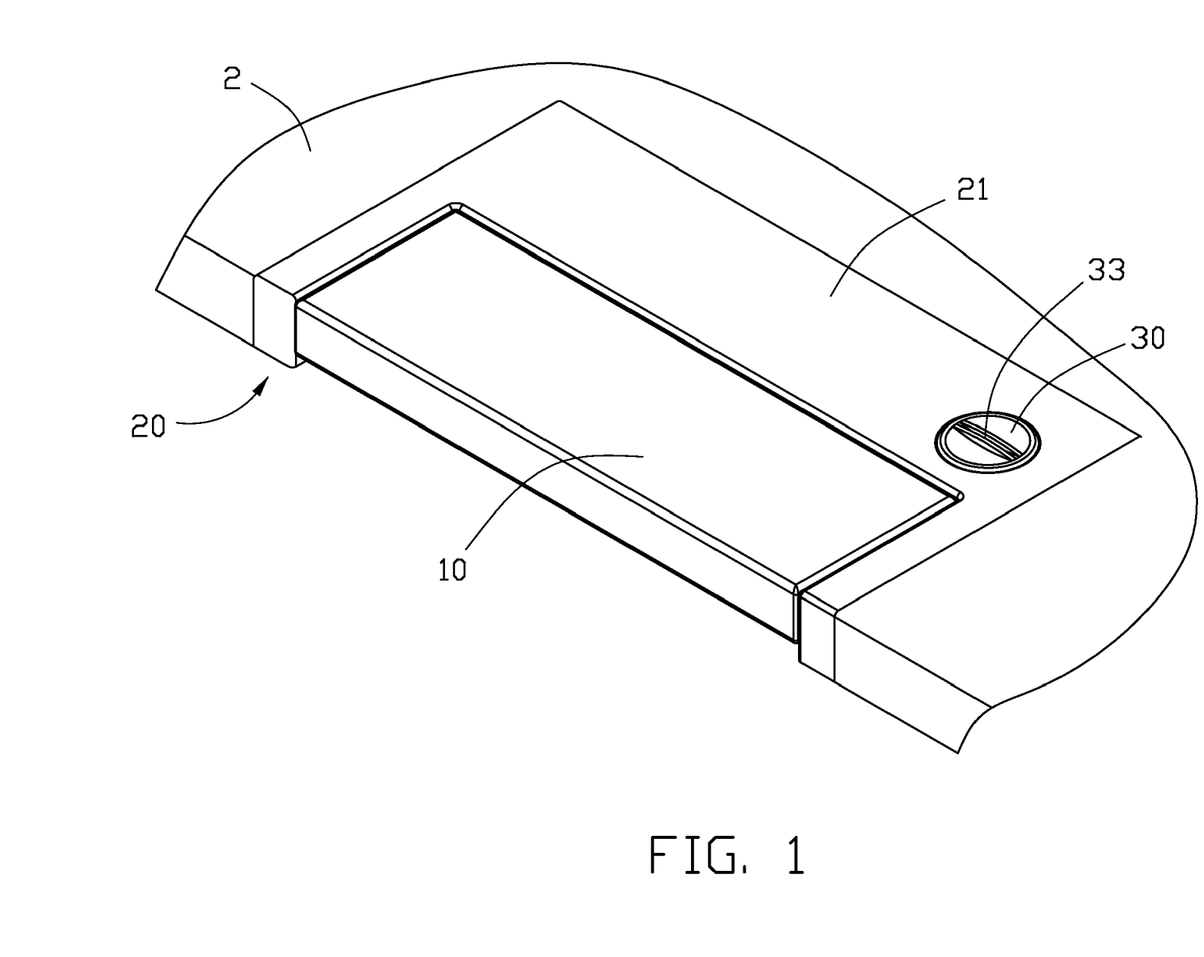
FIG. 1 is an assembled, isometric view of an embodiment of a mounting apparatus for an electronic device, together with a battery module.
Figure 2:
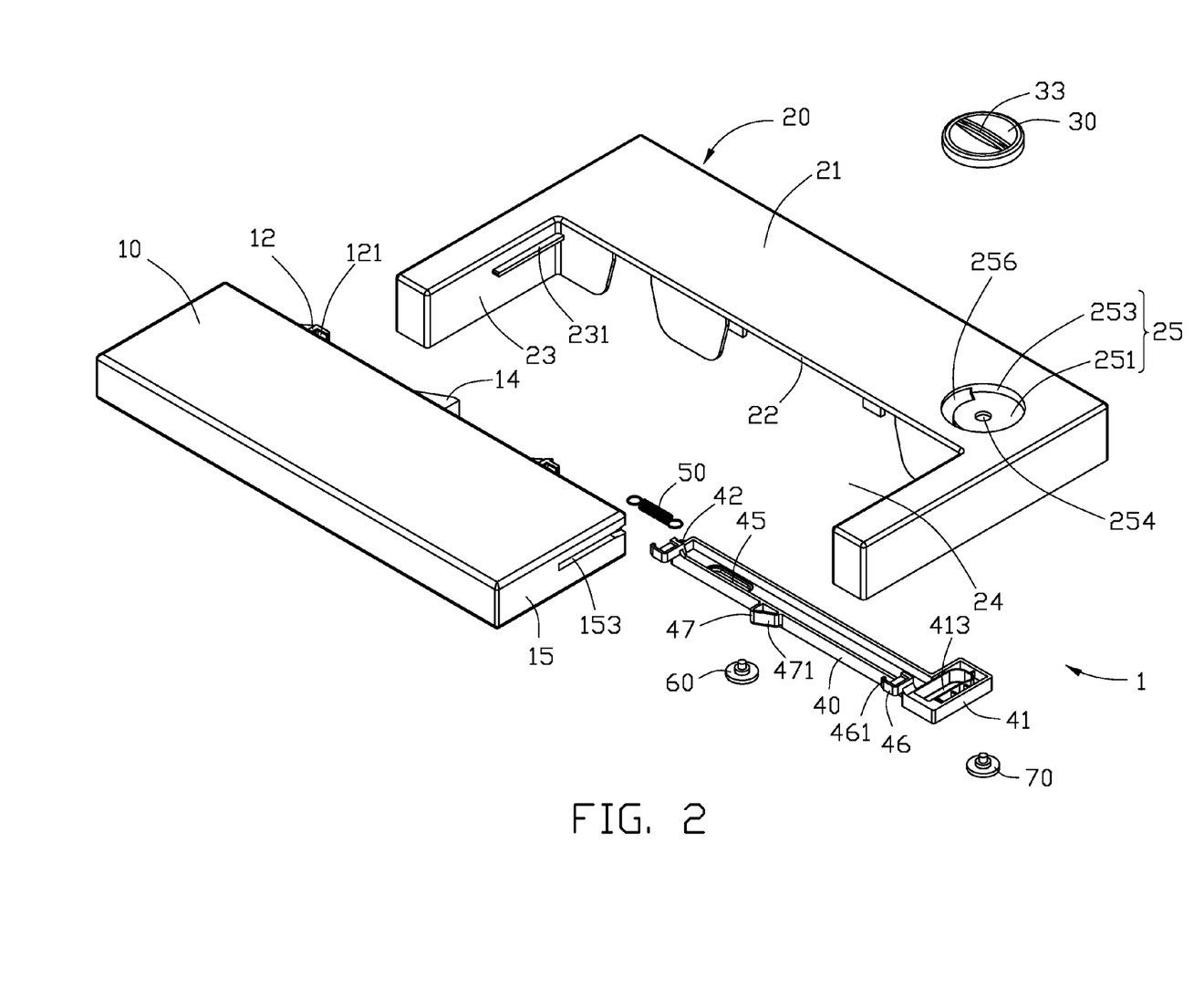
FIG. 2 is an exploded, isometric view of the mounting apparatus and the battery module of FIG. 1.
Figure 3:
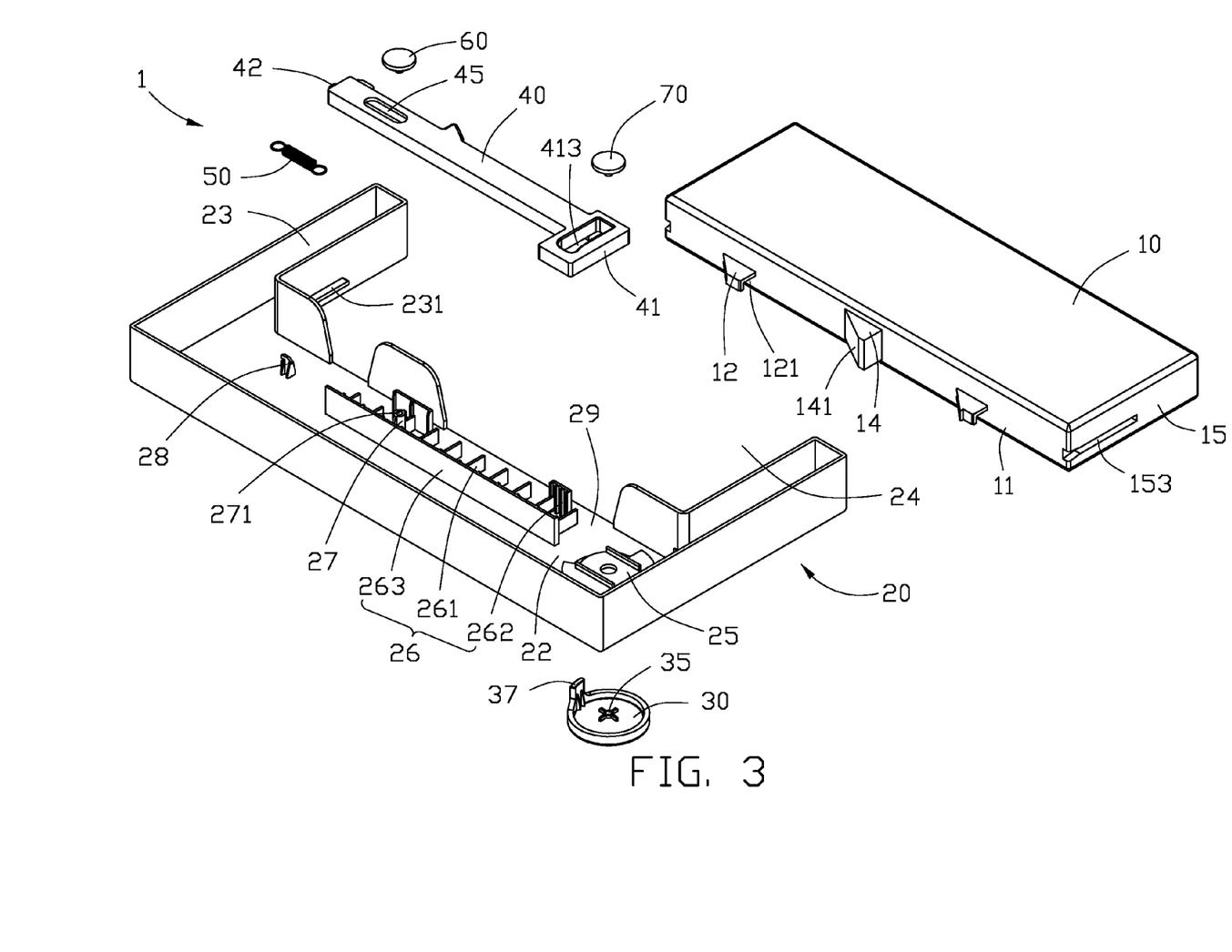
FIG. 3 is an inverted view of FIG. 2.

Referring to FIGS. 1 to 3, an embodiment of a mounting apparatus 1 for fixing a battery module 10 to an electronic device 2 includes a base 20, an operating member 30, an elongated latching member 40, and an elastic member 50.

The battery module 10 includes a sidewall 11, and two opposite end walls 15 perpendicular to the sidewall 11. Two first latching portions 12, each defining a space 121 between an end part of the corresponding latching portion 12 and the sidewall 11, are formed on the sidewall 11. A block 14, forming a slanted surface 141, is formed on the sidewall 11 between the first latching portions 12. Each end wall 15 defines a groove 153, an end of each groove 153 extends through the sidewall 11.

The base 20 is substantially U-shaped, and is installed in the electronic device 2, or integrally formed from a chassis of the electronic device 2. The base 20 includes a fixing portion 22, and two supporting arms 23 extending from opposite ends of the fixing portion 22. The fixing portion 22 and the supporting arms 23 cooperatively form an outside surface 21 exposed to outside of the electronic device, and an inside surface 29 opposite to the outside surface 21. A receiving space 24 is defined bounded by the fixing portion 22 and the supporting arms 23, for receiving the battery module 10. Each supporting arm 23 forms a sliding rail 231 towards the receiving space 24. A circular recess 25 is defined in the outside surface 21, adjacent to one of the supporting arms 23. The recess 25 includes a bottom wall 251 parallel with the outside surface 21, and a sidewall 253 perpendicularly surrounding the bottom wall 251. A through hole 254 is defined in a middle of the bottom wall 251, and an arc-shaped slot 256 is defined in the bottom wall 251, adjacent to and along the sidewall 253.

A first hook 28 is formed on the inside surface 29, adjacent to the other one of the supporting arms 23. An elongated bracket 26 is formed on the inside surface 29 between the first hook 28 and the recess 25. The bracket 26 is perpendicular to the supporting arms 23, and includes a plurality of parallel supporting plates 261, two spaced stop plates 262 adjacent to the receiving space 24, and an elongated stop plate 263 away from the receiving space 24. A fixing post 27, defining a fixing hole 271, is perpendicularly formed on the inside surface 29 between two adjacent supporting plates 261.

The operating member 30 is discoid shaped. An operating portion 33 protrudes from a side of the operating member 30. A protrusion 35, defining a fixing hole, extends from a middle of an opposite side of the operating member 30. An arc-shaped engaging tab 37 extends along a circumference of the operating member 30, in the same direction as the protrusion 35.

An elongated slot 45 is defined in the latching member 40. Two second latching portions 46 and an abutting portion 47 extend from one of two opposite lateral sides of the latching member 40. A latch 461 is formed on each second latching portion 46. A slanted surface is formed on each latch 461 away from the latching member 40. The abutting portion 47 is arranged between the second latching portions 46. The abutting portion 47 includes a slanted surface 471, for matching the slanted surface 141 of the block 14 of the battery module 10. An elongated connecting portion 41 extends from a first end of the latching member 40, and a second hook 42 extends from a second end opposite to the first end of the latching member 40. An elongated opening 413 is defined in the connecting portion 41, and a length direction of the opening 413 is perpendicular to a length direction of the latching member 40.

Figure 7:
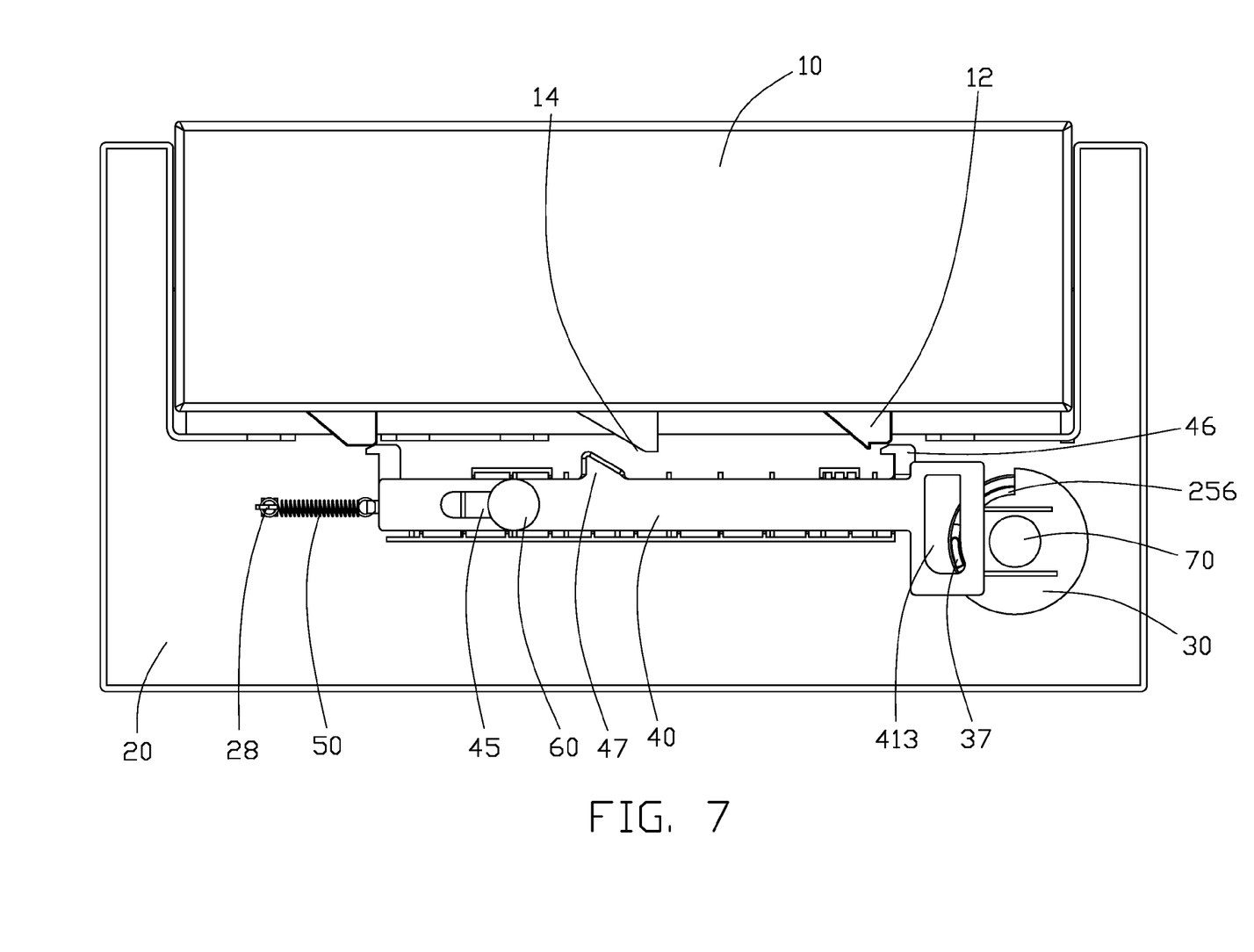

Referring to FIG. 7, to assemble the mounting apparatus 1, the latching member 40 is placed on the plurality of supporting plates 261 of the bracket 26, with the opposite lateral sides of the latching member 40 resisting against the stop plates 262 and 263, respectively, the second latching portions 46 and the abutting portion 47 facing the receiving space 24 of the base 20, and the fixing post 27 is inserted into the slot 45 of the latching member 40. A fastener 60 extends through the slot 45 of the latching member 40, and engages in the fixing hole 271 of the fixing post 27, to prevent the latching member 40 from disengaging from the fixing post 27. Thereby, the latching member 40 is slidably attached to the base 20. A first end of the elastic member 50 is coupled to the first hook 28 of the base 20, and a second end opposite to the first end of the elastic member 50 is coupled to the second hook 42 of the latching member 40. The operating member 30 is received in the recess 25 of the base 20. The engaging tab 37 of the operating member 30 extends through the slot 256 of the recess 25 and is received in the opening 413 of the connecting portion 41 of the latching member 40. A fastener 70 extends through the through hole 254 of the recess 25 from the inside surface 29, and then engages in the fixing hole of the protrusion 35 of the operating member 30, to prevent the operating member 30 from disengaging from the base 20. Thereby, the operating member 30 is rotatably attached to the base 20, and the mounting apparatus 1 is assembled. The elastic member 50 pulls the latching member 40 away from the operating member 30, to make the engaging tab 37 of the operating member 30 engage with a first end wall bounding the opening 413 of the latching member 40 and away from the receiving space 24.

Figure 4:
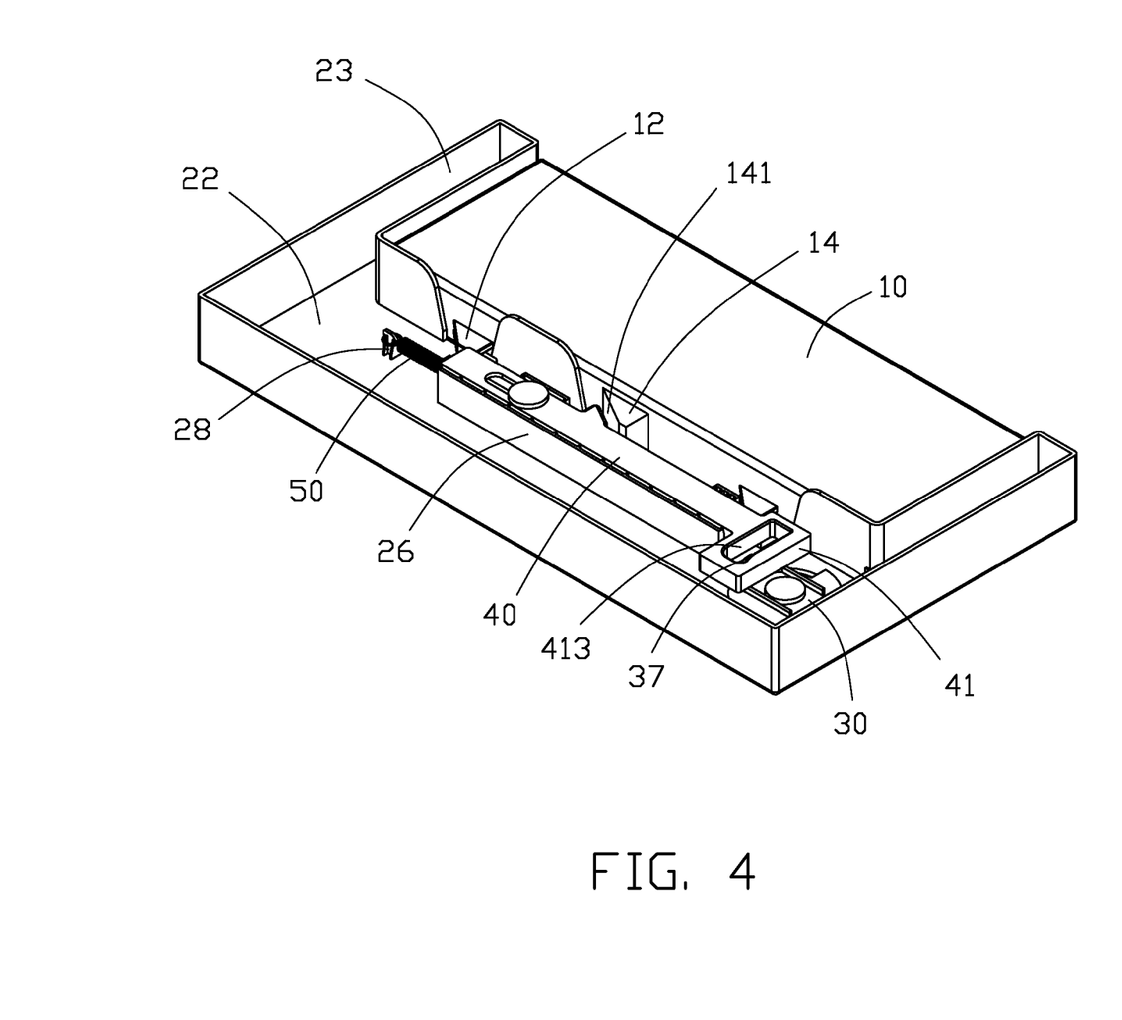
FIG. 4 is an assembled, isometric view of FIG. 3.
Figure 5:
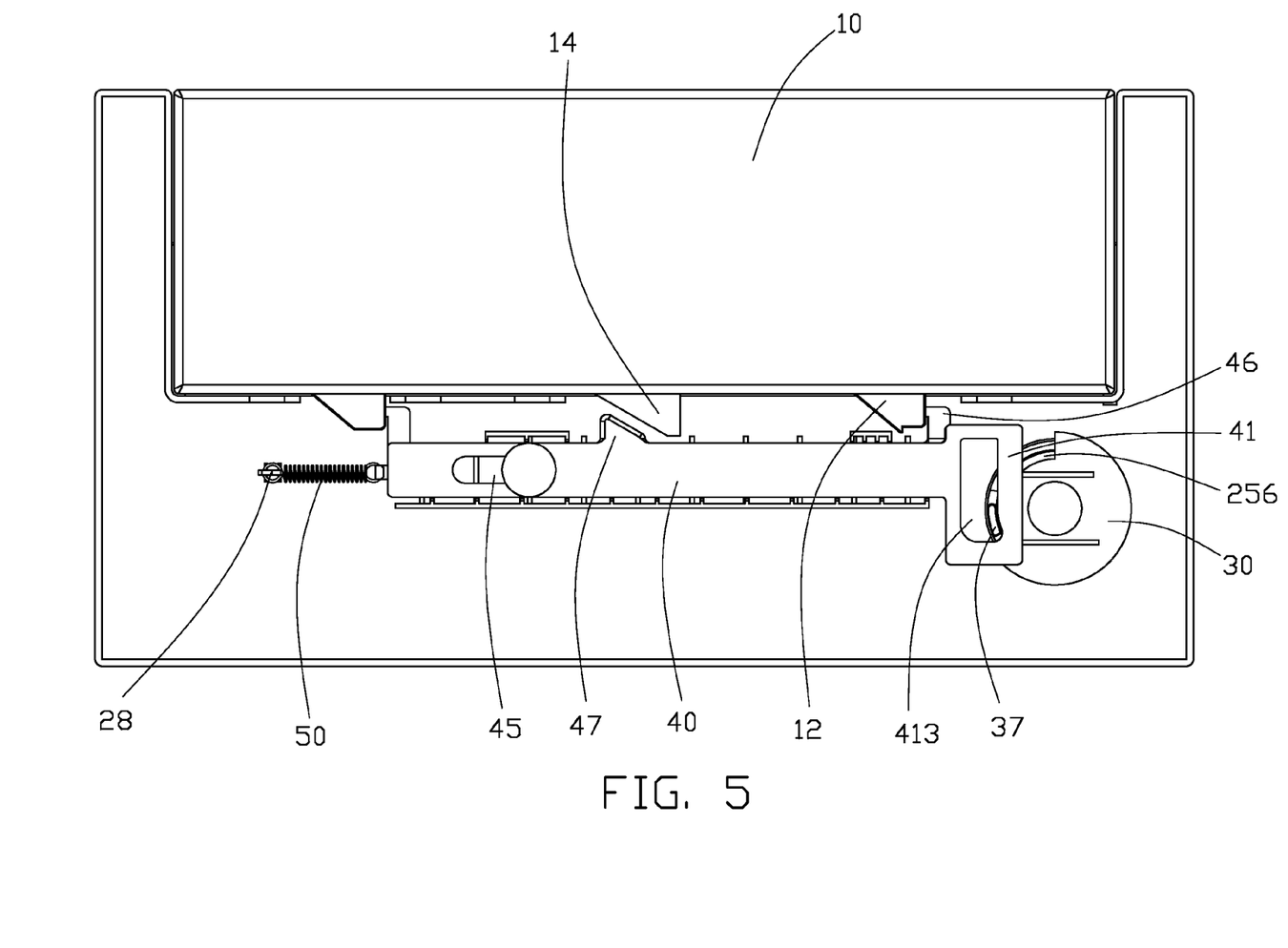
FIG. 5 is a top plan view of FIG. 4.

Referring to FIGS. 4 and 5, to assemble the battery module 10, the battery module 10 is slid into the receiving space 24 of the base 20, with the grooves 153 of the battery module 10 engaging with the sliding rails 231 of the base 20, respectively. The first latching portions 12 of the battery module 10 abut against the slanted surfaces of the second latching portions 46 of the latching member 40, to push the latching member 40 to slide in a first direction, which is away from the elastic member 50. The elastic member 50 is thus stretched. A portion of the latching member 40 bounding the opening 413 pushes the engaging tab 37 of the operating member 30, to drive the operating member 30 to rotate. When the battery module 10 is entirely received in the receiving space 24, the spaces 121 of the first latching portions 12 align with the latches 461 of the second latching portions 46, respectively. The elastic member 50 is restored to pull the latching member 40 to slide in a second direction away from the first direction, until the latches 461 of the latching member 40 engage in the spaces 121 of the battery module 10. Thereby, the battery module 10 is locked.

Figure 6:
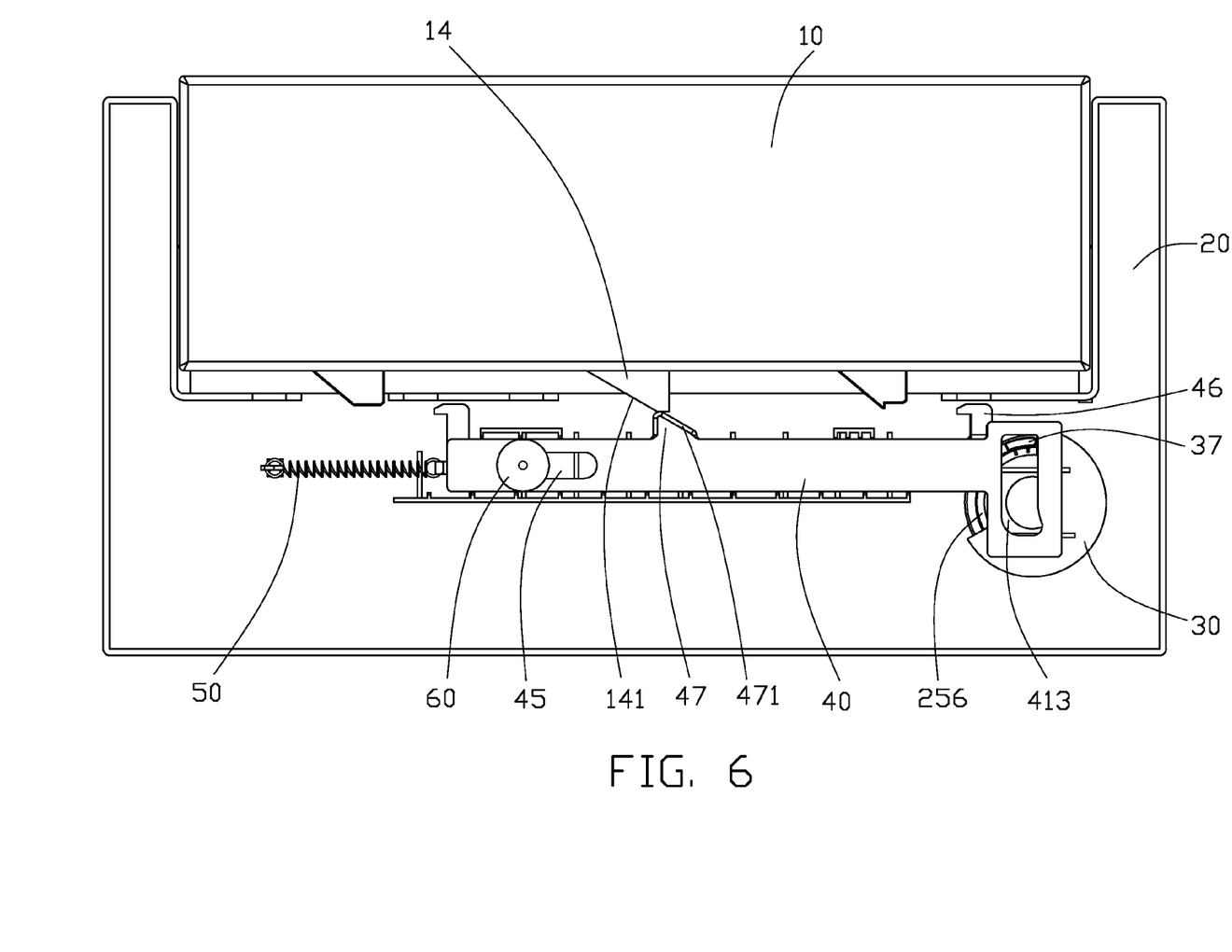
FIGS. 6 and 7 are similar to FIG. 5, but showing the mounting apparatus and the battery module in different states.

Referring to FIG. 6, to detach the battery module 10 from the mounting apparatus 1, the operating portion 33 of the operating member 30 is rotated, to allow the engaging tab 37 to slide clockwise in the slot 256. The engaging tab 37 abuts against the portion bounding the opening 413 of the latching member 40, and pulls the latching member 40 to slide in the first direction. The second latching portions 46 are disengaged from the first latching portions 12 of the battery module 10. Thereby, the battery module 10 is unlocked. The elastic member 50 is stretched. The operating portion 33 is further rotated, to drive the latching member 40 to further slide in the first direction. The slanted surface 471 of the abutting portion 47 of the latching member 40 abuts against the slanted surface 141 of the block 14 of the battery module 10, to push the battery module 10 to slide out of the receiving space 24. When the engaging tab 37 of the operating member 30 is slid to abut against a second end wall opposite to the first end wall bounding the opening 413 of the latching member 40 adjacent to the receiving space 24, the battery module 10 is partially exited from the receiving space 24 and can be easily removed.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mounting apparatus for a battery module, comprising:
    a base defining a receiving space to receive the battery module;
    a latching member slidably attached to the base, the latching member defining an opening, and comprising a latching portion to engage with the battery module and immovably fix the battery module to the base;
    an operating member rotatably attached to an outside surface of the base, wherein the base defines an arc-shaped slot, the operating member comprises an engaging tab extending through the slot and received in the opening of the latching member, when the operating member is rotated, the engaging tab abuts against a portion bounding the opening of the latching member, and drives the latching member to slide linearly to disengage from the battery module; and
    an elastic member connected to the latching member and the base to restore the latching member.

2. The mounting apparatus of claim 1, wherein the latching member comprises a connecting portion at a first end of the latching member, the opening is defined in the connecting portion, and a length direction of the opening is perpendicular to a length direction of the latching member.

3. The mounting apparatus of claim 2, wherein a hook is formed on an inside surface opposite to the outside surface of the base, adjacent to a second end opposite to the first end of the latching member, the elastic member is connected to the hook and the second end of the latching member.

4. The mounting apparatus of claim 1, wherein a circular recess is defined in the outside surface of the base, the operating member is discoid shaped and rotatably received in the recess.

5. The mounting apparatus of claim 4, wherein the recess comprises a bottom wall parallel with the outside surface, a through hole is defined in a middle of the bottom wall, a protrusion, defining a fixing hole, extends from a middle of an inner side of the operating member, a fastener extends through the through hole from an inside surface of the base, and engages in the fixing hole of the protrusion, to prevent the operating member from disengaging from the base.

6. The mounting apparatus of claim 4, wherein the recess comprises a bottom wall parallel with the outside surface, and a sidewall perpendicularly surrounding the bottom wall, the arc-shaped slot is defined in the bottom wall, adjacent to and along the sidewall, the engaging tab extends from a circumference of the operating member.

7. The mounting apparatus of claim 1, wherein an elongated bracket is formed on an inside surface opposite to the outside surface of the base, the bracket comprises a plurality of supporting plates, two spaced stop plates adjacent to the receiving space, and an elongated stop plate away from the receiving space, the latching member is slidably supported on the plurality of supporting plates, and opposite lateral sides of the latching member correspondingly engage with the stop plates.

8. The mounting apparatus of claim 7, wherein an elongated slot is defined in the latching member, a fixing post defining a fixing hole is perpendicularly formed on the inside surface between two adjacent supporting plates, a fastener extends through the slot of the latching member and engages in the fixing hole of the fixing post, to prevent the latching member from disengaging from the base.

9. The mounting apparatus of claim 1, wherein an abutting portion extends from the latching member towards the receiving space, the abutting portion comprises a slanted surface, when the operating member is rotated, the slanted surface abuts against the battery module and pushes the battery module to slide out of the receiving space after the latching member is disengaged from the battery module.

10. The mounting apparatus of claim 1, wherein the base is substantially U-shaped, and comprises a fixing portion, and two supporting arms extending from opposite ends of the fixing portion, the receiving space is bounded by the fixing portion and the supporting arms, each of the supporting arms forms a sliding rail towards the receiving space to support the battery module.

11. A mounting apparatus for a battery module, comprising:
    a base comprising a fixing portion, two supporting arms extending from opposite ends of the fixing portion, the base defining a receiving space bounded by the fixing portion and the supporting arms, to receive the battery module;
    a latching member slidably arranged inside of the fixing portion, the latching member comprising a latching portion towards the receiving space to engage with the battery module and immovably fix the battery module to the base, and the latching member defining an opening; and an operating member rotatably attached to the base, the operating member comprising an operating portion exposed outside of the base, and an engaging tab received in the opening of the latching member, when the operating member is rotated, the engaging tab abuts against a portion bounding the opening of the latching member, and pulls the latching member to slide linearly to disengage from the battery module.

12. The mounting apparatus of claim 11, wherein the latching member comprises a connecting portion at a first end of the latching member, the opening is defined in the connecting portion, and a length direction of the opening is perpendicular to a length direction of the latching member.

13. The mounting apparatus of claim 12, wherein a hook is formed on an inside surface of the base adjacent to a second end opposite to the first end of the latching member, an elastic member is connected between the hook and the second end of the latching member.

14. The mounting apparatus of claim 11, wherein a circular recess is defined in an outside surface of the base, the operating member is discoid shaped and rotatably received in the recess.

15. The mounting apparatus of claim 14, wherein the recess comprises a bottom wall parallel with the outside surface, a through hole is defined in a middle of the bottom wall, a protrusion, defining a fixing hole, extends from a middle of an inner side of the operating member, a fastener extends through the through hole from an inside surface of the base, and engages in the fixing hole of the protrusion, to prevent the operating member from disengaging from the base.

16. The mounting apparatus of claim 14, wherein the recess comprises a bottom wall parallel with the outside surface, and a sidewall perpendicularly surrounding the bottom wall, an arc-shaped slot is defined in the bottom wall, adjacent to and along the sidewall, the engaging tab extends from a circumference of the operating member and extends through the arc-shaped slot.

17. The mounting apparatus of claim 11, wherein an elongated bracket is formed on an inside surface of the base, the bracket comprises a plurality of supporting plates, two spaced stop plates adjacent to the receiving space, and an elongated stop plate away from the receiving space, the latching member is slidably arranged on the plurality of supporting plates, and opposite lateral sides of the latching member correspondingly engage with the stop plates.

18. The mounting apparatus of claim 17, wherein an elongated slot is defined in the latching member, a fixing post defining a fixing hole is perpendicularly formed on the inside surface between two adjacent supporting plates, a fastener extends through the slot of the latching member and engages in the fixing hole of the fixing post, to prevent the latching member from disengaging from the base.

19. The mounting apparatus of claim 11, wherein an abutting portion extends from the latching member towards the receiving space, the abutting portion comprises a slanted surface, when the operating member is rotated, the slanted surface abuts against the battery module and pushes the battery module to slide out of the receiving space after the latching member is disengaged from the battery module.

20. The mounting apparatus of claim 11, wherein each of the supporting arms forms a sliding rail towards the receiving space to support the battery module.

* * * * *